United States Patent
Üstünberk et al.

(10) Patent No.: US 11,161,433 B2
(45) Date of Patent: Nov. 2, 2021

(54) RECLINING DEVICE FOR A VEHICLE SEAT

(71) Applicant: MARTUR ITALY S.R.L., Milan (IT)

(72) Inventors: Can Üstünberk, Grugliasco (IT); Bruno Zambon, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 17/279,108

(22) PCT Filed: Sep. 24, 2019

(86) PCT No.: PCT/IB2019/058074
§ 371 (c)(1),
(2) Date: Mar. 24, 2021

(87) PCT Pub. No.: WO2020/065515
PCT Pub. Date: Apr. 2, 2020

(65) Prior Publication Data
US 2021/0309130 A1  Oct. 7, 2021

(30) Foreign Application Priority Data

Sep. 25, 2018  (IT) .................. 102018000008904

(51) Int. Cl.
*B60N 2/225* (2006.01)
*B60N 2/235* (2006.01)

(52) U.S. Cl.
CPC ......... *B60N 2/2254* (2013.01); *B60N 2/2252* (2013.01); *B60N 2/2352* (2013.01)

(58) Field of Classification Search
CPC .................... B60N 2/2254; B60N 2/2352
See application file for complete search history.

(56) References Cited

U.S. PATENT DOCUMENTS 8,905,479 B2 * 12/2014 Lehmann ............... B60N 2/225
                                                        297/362
8,944,508 B2   2/2015 Ohba et al.
(Continued)

FOREIGN PATENT DOCUMENTS

DE           10157274 A1   6/2003
DE       102009038735 A1   3/2011
(Continued)

OTHER PUBLICATIONS

International Search Report and Written Opinion of the International Searching Authority dated Dec. 19, 2019 for International Patent Application No. PCT/IB2019/058074.
(Continued)

*Primary Examiner* — Timothy J Brindley
(74) *Attorney, Agent, or Firm* — Howson & Howson LLP

(57) ABSTRACT

A reclining device for a vehicle seat of the kind comprising a first plate carrying an internal gear and a second plate carrying an external gear cooperating with the internal gear is provided. The reclining device includes first and second wedge elements for preventing undesired rotation of the external and internal gears relative to each other. The reclining device further includes a lock spring comprising one or more locking teeth intended to engage a ring gear which is integral with one of the first and second plates for inhibiting relative rotation of the plates, and one or more spring arms, which elastically urge the locking teeth toward the ring gear. The spring arms outwardly extend from the outer perimeter of the body of the lock spring.

9 Claims, 4 Drawing Sheets

(56) References Cited

U.S. PATENT DOCUMENTS

| | | | |
|---|---|---|---|
| 9,167,898 B2 | 10/2015 | Wahls et al. | |
| 10,493,870 B2 * | 12/2019 | Oishi | B60N 2/2213 |
| 11,001,173 B2 * | 5/2021 | Spagnoli | B60N 2/2227 |
| 2010/0308634 A1 | 12/2010 | Narita et al. | |
| 2013/0319144 A1 | 12/2013 | Kirubaharan et al. | |
| 2015/0298584 A1 * | 10/2015 | Schuler | B60N 2/2254 |
| | | | 297/361.1 |
| 2020/0114786 A1 | 4/2020 | Costantino | |
| 2020/0180475 A1 | 6/2020 | Ustunberk et al. | |
| 2021/0023968 A1 | 1/2021 | Spagnoli et al. | |

FOREIGN PATENT DOCUMENTS

| | | |
|---|---|---|
| DE | 102011016656 B3 | 8/2012 |
| DE | 102011111853 A1 | 2/2013 |
| EP | 2272707 A2 | 1/2011 |
| EP | 2586650 A2 | 5/2013 |
| WO | 2012/065721 A1 | 5/2012 |

OTHER PUBLICATIONS

International Preliminary Report on Patentability of the International Preliminary Examining Authority dated Feb. 8, 2021 for International Patent Application No. PCT/IB2019/058074.

* cited by examiner

RECLINING DEVICE FOR A VEHICLE SEAT

TECHNICAL FIELD

The present invention relates to a reclining device for a vehicle seat.

More particularly, the present invention relates to a reclining device for a vehicle seat with improved reliability.

BACKGROUND ART

Vehicle seats generally have a sliding function for pushing or pulling the seat cushion in a forward or backward direction, a height adjustment function for adjusting the height of the seat cushion and a reclining function for adjusting the inclination of the seat backrest relative to the seat cushion.

This reclining function is usually implemented by a reclining device arranged at the junction between the seat cushion and the seat backrest.

Reclining devices are known from the art which comprise a first plate attached to the seat cushion and including an internal gear and a second plate attached to the seat backrest and including an external gear, or vice versa. The external gear is eccentrically arranged with respect to the internal gear and the teeth of a portion of the outer circumference of the external gear mesh with the teeth of a respective portion of the inner circumference of the internal gear. A driver is arranged for rotating the external gear and the internal gear relative to each other in order to modify the inclination of the seat backrest with respect to the seat cushion.

In order to prevent an accidental, undesired rotation of the external gear and the internal gear relative to each other, a pair of wedge elements are arranged in the space between the hub of the internal gear and a bearing fitted in a central hole of the external gear. As the external gear is eccentrically arranged with respect to the internal gear, the space defined between said hub of the internal gear and said bearing integral with the external gear is crescent-shaped. Accordingly, the wedge elements, which have the same configuration and are arranged symmetrically to each other, have a wider portion and a narrower portion: the wedge elements are arranged in the crescent-shaped space so that their wider portions face each other near the middle part of the crescent-shaped space, while their narrower portions are oriented towards respective, opposite sides of said crescent-shaped space.

The reclining device further comprises a wedge spring, which has an omega-shape comprising a circular portion ending with two, parallel arms, each of said arms engaging a respective wedge element, which is correspondingly provided with a suitable seat for the spring arm. The wedge spring biases the wedge elements apart from each other, so that they are pushed towards the opposite ends of the crescent-shaped space and press against the surfaces of the hub of the internal gear and of the bearing integral with the external gear, thus exerting their wedge effect and preventing rotation of the external and internal gears relative to each other.

Reclining devices of the kind described above are shown, for instance in documents US 2010/0308634, EP 2 272 707 and EP 2 586 650.

In order to inhibit changing or creeping of the seat backrest to a position that differs from that at which it is initially set, the reclining device may further comprise a lock spring. As such, the lock spring may help to maintain a desired seat backrest position during dynamic operating conditions and avoid rotational creep of the reclining device and associated seat backrest.

U.S. Pat. No. 9,167,898 discloses a reclining device comprising such a lock spring.

The lock spring disclosed in the aforesaid documents is arranged between the driver and the internal and external gears, and comprises a body which is made as a thin sheet of metal and is provided with one or more locking teeth configured to engage the external gear or a dust cover integral with the external gear. More particularly, said locking teeth are configured to be received in a space between two consecutive teeth of a ring gear provided on said external gear or in said dust cover for preventing relative rotation of the internal and external gears; two locking teeth are usually provided, which are symmetrically arranged on the body of the lock spring.

The body of the lock spring is also provided with one or more driver engagement elements so that the lock spring can rotate with the driver.

The lock spring is normally in a braked configuration, in which relative rotation of the internal and external gears is inhibited. To this purpose, the body of the lock spring is further provided with one or more spring arms that can engage a raised rim provided on the external gear and bias the locking teeth towards the teeth of the above-mentioned ring gear.

The body of the lock spring is further provided with one or more windows, through which the arms of the wedge spring pass. The edges of each window are configured to engage a corresponding arm of the wedge spring to actuate the wedge spring upon rotation of the driver and lock spring.

As mentioned above, the lock spring is generally biased to the braked configuration and switching from the braked configuration to the unbraked configuration can occur by rotating the driver and the lock spring in either a clockwise or a counterclockwise direction.

In a braked configuration, the lock spring is biased by its spring arms to a position in which the lock teeth are received and locked in a space between consecutive teeth of the ring gear provided on the external gear or on the dust cover integral with said external gear.

When the user wishes to modify the inclination of the seat backrest relative to the seat cushion, the driver is rotated, either clockwise or counter-clockwise.

Rotation of the driver causes the lock spring to rotate with the driver and this rotation of the lock spring moves the locking teeth to a position in which they are no longer locked in the space between consecutive teeth of the ring gear.

Upon further rotation of the driver and lock spring, an arm of the wedge spring will engage the edge of a corresponding window of the lock spring body and the biasing force exerted by the wedge spring will keep the arm of said wedge spring engaged with said edge of said window, thus restricting rotation of the lock spring.

As a result, the lock spring will move slightly upward and the locking teeth will move further away from the teeth of the ring gear. Consequently, the locking teeth will disengage and be held away from the teeth of the ring gear, so as to prevent braking and thereby permit relative rotation of the internal and external gears.

Very shortly or immediately after the lock spring moves slightly upward, the driver engages one of the wedge elements and a further rotation of the driver allows the external gear to begin to rotate with respect to the internal gear, so as to allow the seat back to pivot.

The configuration disclosed in U.S. Pat. No. 9,167,898, namely the configuration of the lock spring disclosed in said document, has some relevant drawbacks.

More specifically, the spring arms used for biasing the lock spring in the braked configuration extend inwardly with respect to the outer perimeter of the sheet-shaped body of the lock spring.

As a result, during operation of the reclining device, these spring arms can contact the body of the lock spring and rub against it, thus generating friction.

This may entail wear of the lock spring and malfunction of the reclining device.

DE 102011016656 discloses a lock spring substantially having the same structure as described above and provided with spring arms for elastically urging the locking teeth towards the ring gear, in which lock spring the spring arms extend outwardly from the outer perimeter of the body of the lock spring.

As a result, during operation, the spring arms do not contact the body of the lock spring and no rubbing is generated.

WO 2012/065721 also discloses a lock spring having a similar structure.

However, even these solutions have relevant drawbacks.

More particularly, the lock spring disclosed in DE 102011016656 comprises two spring arms having a first, outwardly projecting portion and a second portion running parallel to the outer periphery of the body of the lock spring. Such second portion is very short and spans over a small angle of the outer periphery of the lock spring body.

As a consequence, correct and reliable operation of a lock spring as disclosed in the above-cited document strongly depends on the geometry and on the stiffness of the spring arms.

Therefore, very low tolerances in designing such spring arms and, more generally, the lock spring are allowed, which entails an increase in manufacturing costs.

The main object of the present invention is to obviate such drawbacks, by providing a reclining device comprising a lock spring with a new, improved design, allowing to increase the reliability of the reclining device and reduce the manufacturing costs thereof.

This and other objects are achieved by a reclining device as claimed in the appended claims.

SUMMARY OF INVENTION

The present invention relates to a reclining device for a vehicle seat comprising:
a first plate including an internal gear and a second plate including an external gear, said external gear being eccentrically arranged with respect to said internal gear and the teeth of said external gear meshing the teeth of said internal gear at a portion of the circumferences of said gears;
a first and second wedge elements, configured to exert a wedge effect for preventing rotation of said external gear and said internal gear relative to each other, and a wedge spring biasing said wedge elements to the configuration in which they exert said wedge effect;
a driver for causing the external gear and the internal gear to rotate relative to each other for adjusting the inclination of the second plate with respect to the first plate; and
a lock spring, that is switchable from a braked configuration to an unbraked configuration for selectively preventing or allowing rotation of the reclining device, wherein said lock spring is integral in rotation with the driver when in its braked configuration and is not integral in rotation with the driver when in its unbraked configuration.

Said lock spring comprises a body which is made as a thin sheet having a generally circular shape, preferably made of metal, and is provided with one or more locking teeth, configured to engage a ring gear integral with one of said first and second plates when the lock spring is in its braked configuration and to be disengaged from said ring gear when the lock spring is in its unbraked configuration.

The body of the lock spring is further provided with a pair of spring arms that can abut against said one of said plates and bias said locking teeth towards said ring gear, thus biasing the lock spring towards the braked configuration.

According to the invention, said spring arms extend outwardly from the outer perimeter of the body of the lock spring and in opposite directions.

Thanks to such arrangement, rubbing of the spring arms against the body of the lock spring during operation can be avoided.

According to the invention, each of sais spring arms comprises a first outwardly projecting portion and a second portion running along the outer periphery of the body of the lock spring, wherein said second portion has a remarkable extension and spans over an angle of more than 45° along the outer periphery of the lock spring body.

Accordingly, the spring arms offer a large contact area, much larger than the spring arms of the lock springs according to prior art.

As a result, the operation of the lock spring according to the invention is less dependent on the exact geometry and on the stiffness of the spring arms than lock springs according to prior art.

This allows to have less strict tolerances in lock spring manufacturing, thus allowing to reduce the manufacturing costs of said lock spring.

Indeed, due to the large contact area offered by the spring arms, even in case of high tolerances, the spring arms will abut against a counter-surface for urging the locking teeth towards the braked configuration.

In a preferred embodiment of the invention, the second portion of each spring arm does not run parallel to the outer periphery of the lock spring body; instead, such second portion has an irregular profile, so that the capability of compensating high tolerances is increased.

In a particularly preferred embodiment, the second portion of each spring arm has a first section, proximal to the first portion of the spring arm, which is farther from the outer rim of the lock spring body, and a second section which increasingly approaches the outer rim of the lock spring body. Said second section terminates with a free end, distal from the first portion of the spring arm, which is substantially tangent to the outer rim of the lock spring body.

In a preferred embodiment of the invention the body of the lock spring has a general circular shape and the spring arms are symmetrical arranged with respect to a first diameter of the lock spring body.

According to this preferred embodiment, the lock spring is provided with two locking teeth, which are symmetrical arranged with respect to said first diameter of the lock spring body.

According to this preferred embodiment of the invention, the locking teeth are arranged along the circumference of the lock spring body on the side of a second diameter of said lock spring body opposite to the spring arms, said second diameter being perpendicular to said first diameter of said lock spring body.

According to a preferred embodiment of the invention, the lock spring further comprises a wedge engaging element that can be brought to abut against and engage the first or the second wedge element. As a consequence, in a locking configuration of the reclining device undesired self-rotation of the wedge elements is directly restricted by the lock spring through said wedge engaging element.

The direct interaction between the lock spring and the wedge elements advantageously makes the chain of kinematic transmission simpler and avoids any loss of force and function between the lock spring and the wedge elements, thus rendering the reclining device more reliable.

BRIEF DESCRIPTION OF DRAWINGS

Further features and advantages of the invention will become more evident from the detailed description of a preferred embodiment thereof, given by way of non limiting example, with reference to the attached drawings, in which:

FIG. 1 is an exploded perspective view of a reclining device according to the invention;

FIG. 2 is a front view of the reclining device of FIG. 1, shown with the driver being removed;

FIG. 3 is a front view of the lock spring of the reclining device of FIG. 1;

FIG. 4a

FIG. 4a shows in detail the engagement between the lock spring and the first plate of the reclining device of FIGS. 1 and 2 in a braked configuration;

FIG. 4b shows in detail the engagement between the lock spring and the first plate of the reclining device of FIGS. 1 and 2 in an unbraked configuration.

DESCRIPTION OF EMBODIMENTS

Figure 1:
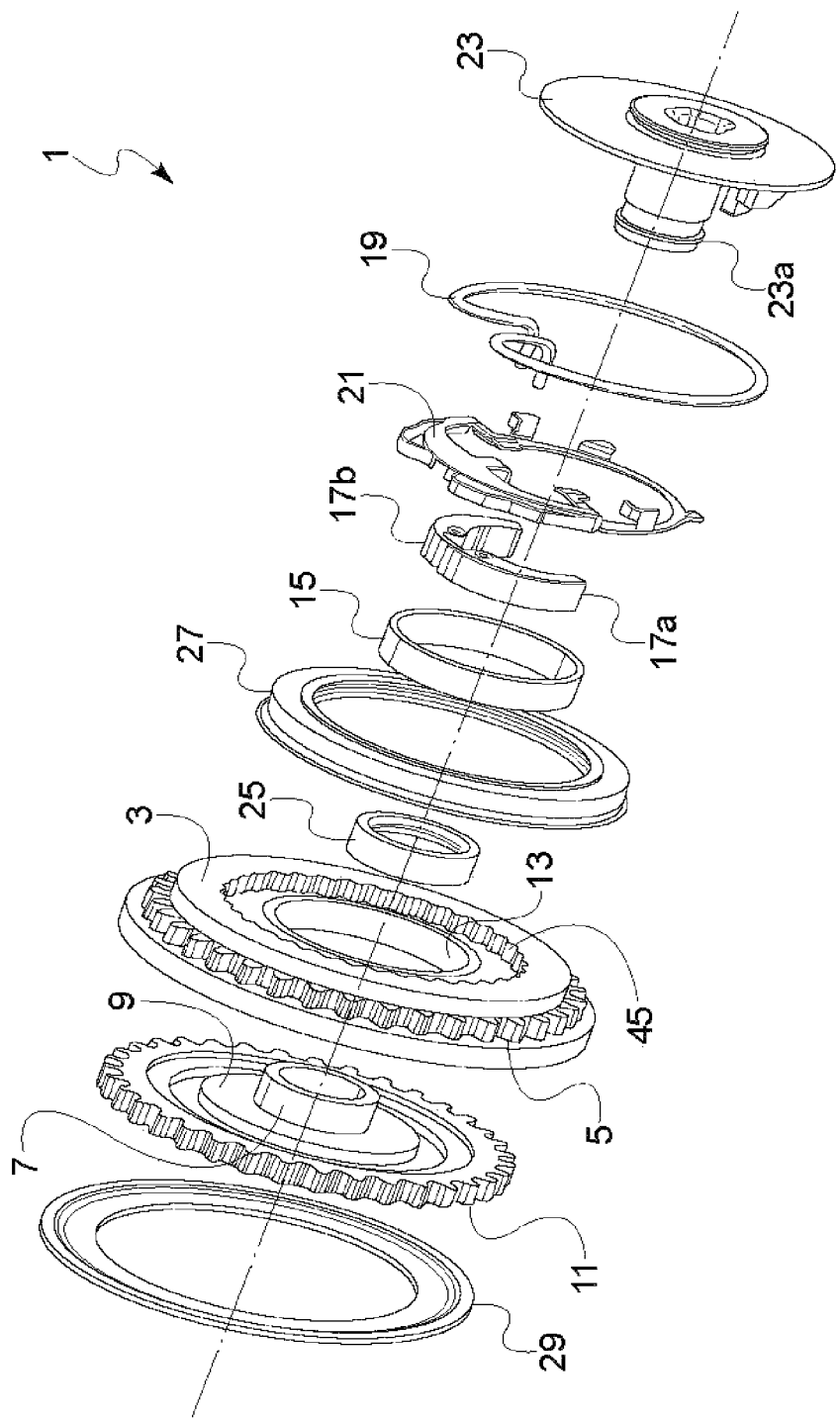
FIG. 1
Figure 2:
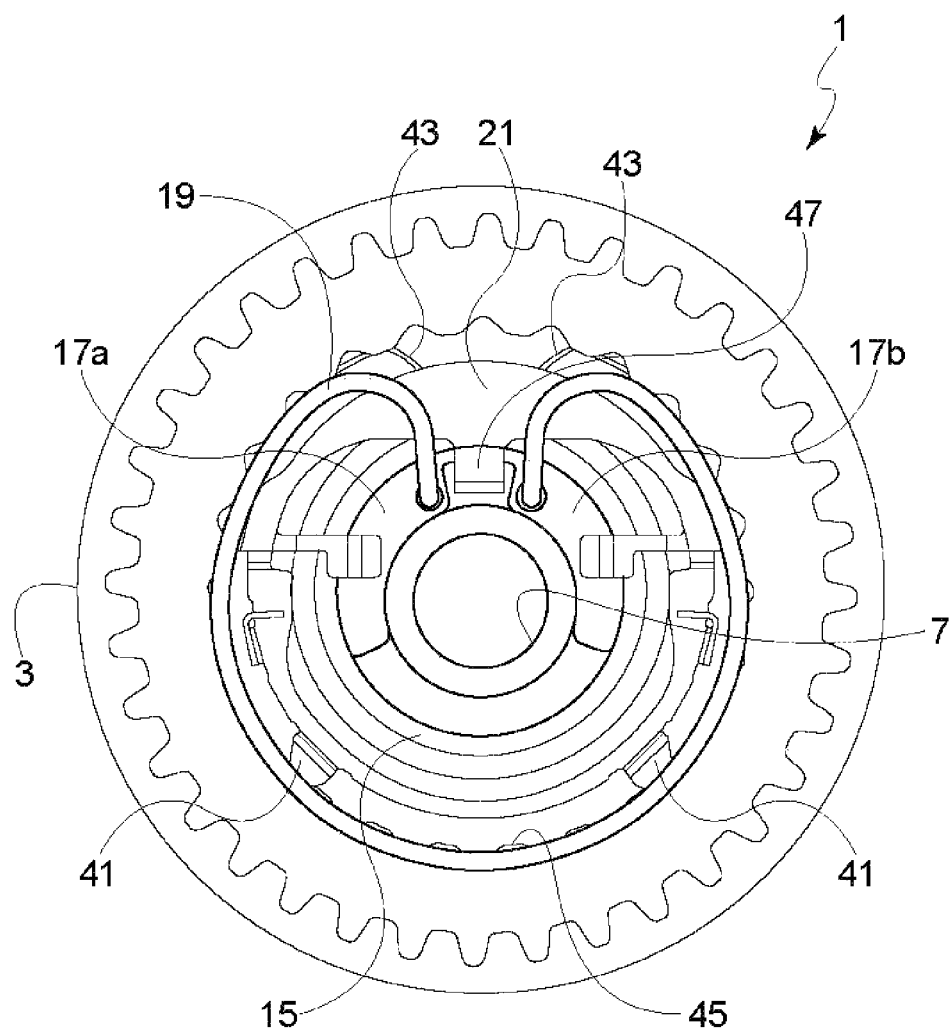
FIG. 2

With reference to FIGS. 1 and 2, a reclining device 1 according to the invention is shown.

Said reclining device 1 comprises a first plate 3, which can be attached to a seat cushion (or to a seat backrest) and which includes an internal gear 5, and a second plate 9, which can be attached to a seat backrest (or to a seat cushion) and which includes an external gear 11.

The first plate 3 comprise a central hole 13 through which a hub 7 of the second plate 9 can be inserted, so that the external gear 11 of the second plate and the internal gear 5 of the first plate can cooperate.

In a per se known manner, the internal gear 5 and external gear 11 are eccentrically arranged with respect to each other and the teeth of a portion of the outer circumference of the external gear 11 mesh with the teeth of a respective portion of the inner circumference of the internal gear 5.

The hub 7 of the second plate 9 and a bearing 15 fitted in the central hole 13 of the first plate 3 define between them a crescent-shaped space which receives a first and second wedge elements 17a, 17b, which are arranged with their wider portions facing each other near the middle part of said crescent-shaped space and with their narrower portions oriented towards respective, opposite ends of said crescent-shaped space.

A wedge spring 19, which has an omega-shape comprising a circular portion ending with two, parallel arms, engages with its arms the wedge elements 17a, 17b and biases said wedge elements apart from each other, so that they are pushed towards the opposite ends of the crescent-shaped space and press against the surfaces of said hub 7 and of said bearing 15.

The reclining device includes a driver 23 which is arranged for acting onto the wedge elements 17a, 17b for allowing the external gear and the internal gear to rotate relative to each other. The driver 23 is provided with a snap ring 23a engaging a bushing 25 for packing the components of the reclining device together and restricting lateral movements of the reclining device.

The reclining device 1 also comprises a first cover 27, which is preferably made of a plastic material, and a second cover 29, which is preferably made of a metal.

Figure 3:
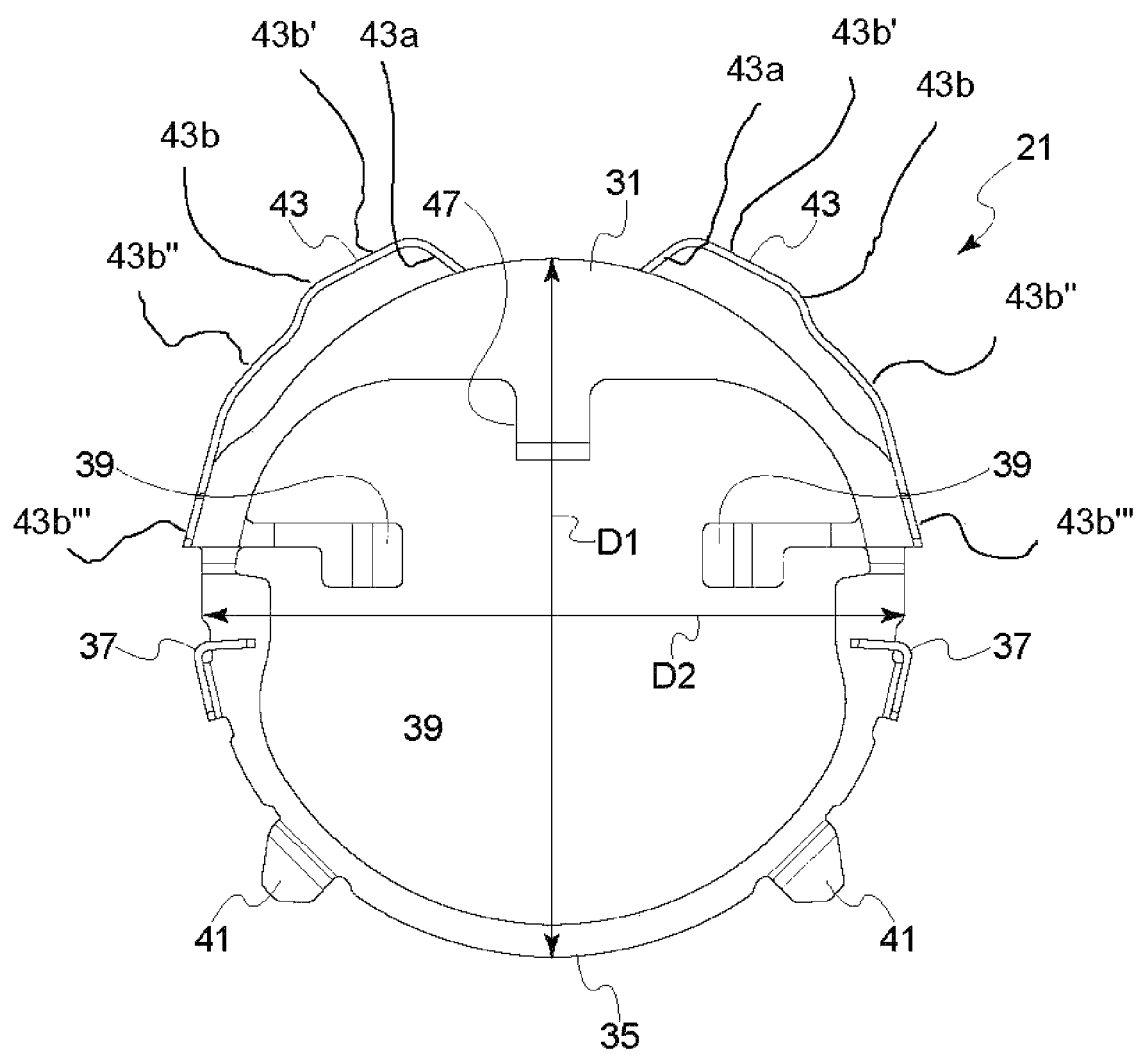
FIG. 3

Still with reference to FIGS. 1 and 2, the reclining device 1 further comprises a lock spring 21, which is shown in greater detail in FIG. 3.

The lock spring 21 comprises a body 31 which is made as a thin sheet, preferably made of metal and, according to the shown embodiment, has a substantially circular overall shape.

The body 31 of the lock spring is provided with a central through-hole 33, through which the driver 23 penetrates and which defines a peripheral annular band 35.

A pair of bent tabs 37 protrude from said annular band 35 towards the driver 23 for engagement with said driver. Said bent tabs 37 are preferably symmetrically arranged with respect to a first diameter D1 of the body 31 of the lock spring.

A pair of bent arms 39 inwardly extend from the annular band 35 towards the center of the central through-hole 33 of the spring lock, which bent arms 39 are configured to contact the wedge elements 17a, 17b. Said bent arms 39 are preferably symmetrically arranged with respect to said first diameter D1 of the body 31 of the lock spring.

A pair of locking teeth 41 outwardly extend from the annular band 35. Said locking teeth 39 are preferably symmetrically arranged with respect to said first diameter D1 of the body 31 of the spring lock.

The locking teeth 41 are intended to engage a ring gear 45 (see FIGS. 1 and 2) which is integral with the first plate 3. More particularly, each locking tooth 41 is intended to penetrate into the space between two consecutive teeth of the ring gear 45, thus inhibiting relative rotation of the first and second plates 3, 9.

It will be evident that in alternative embodiments the locking teeth of the lock spring could be intended to engage a ring gear which is integral with the second plate 9, with the same result of inhibiting relative rotation of the first and second plates 3, 9.

The lock spring 21 is normally biased in a braked configuration, in which the locking teeth 41 engage the ring gear 45.

To this purpose, the lock spring 21 is provided with a pair of spring arms 43, which abut against the first plate 3 (which, to this purpose, can be provided with a protruding rim) and elastically urge the locking teeth 41 towards the ring gear 45.

According to the invention, the spring arms 43 outwardly extend from the circumference of the body 31 of the lock spring, i.e. from the annular band 35, in opposite directions.

Thanks to this arrangement, the spring arms 43 do not rub against the body 31 of the lock spring 21 during operation, so that any risk of undesired friction is avoided.

This entails several advantages, as it allows to avoid malfunction of the lock spring, as well as early wear of the spring arms of said lock spring.

According to the invention, each of said spring arms 43 comprises a first outwardly projecting portion 43a and a second portion 43b running along the outer periphery of the body of the lock spring.

Such second portion 43b of each spring arm 43 has a remarkable extension and spans over an angle of more than 45° along the outer periphery of the body 31 of the lock spring 21, preferably over an angle of about 60° along the outer periphery of the body 31 of the lock spring 21.

Accordingly, the operation of the lock spring 21 is less dependent on the geometry and on the stiffness of the spring arms 43, so that greater tolerances in manufacturing said spring arms are allowed without jeopardizing the reliability of the lock spring.

In the preferred embodiment shown in FIG. 3, the second portion 43b of each spring arm does not run parallel to the outer periphery of the lock spring body. Instead, such second portion 43b has an irregular profile, so that the capability of compensating high tolerances is increased.

In detail, in the preferred embodiment shown in FIG. 3, the second portion 43b of each spring arm 43b has a first section 43b', proximal to the first portion of the spring arm, which is farther from the outer rim of the body 31 of the lock spring 21, and a second section 43b" which increasingly approaches the outer rim of the body 31 of the lock spring 21.

Said second section 43b" terminates with a free end 43b''', distal from the first portion 43a of the spring arm 43, which is substantially tangent to the outer rim of the body 31 of the lock spring.

Due to such configuration, at least one section of the second portion of each spring arm will abut against the first plate 3 for effectively urging the locking teeth 41 towards the ring gear 45.

As clearly shown in FIG. 3, according to the invention, the locking teeth 41 are arranged on the annular band 35 on the opposite side of a second diameter D2 of the lock spring body perpendicular to the first diameter D1 to the spring arms 43.

In the preferred embodiment shown in the Figures, the lock spring 21 is configured to directly cooperate with the wedge elements 17a, 17b.

To this purpose, the lock spring 21 is provided with a wedge engaging tab 47 that can be brought to abut against and engage the first or the second wedge element.

In a locking configuration of the reclining device, the wedge elements 17a, 17b may undergo slight rotations, but, as soon as the wedge engaging tab 47 of the lock spring 21 abuts against and engages the first or second wedge element 17a, 17b, a further rotation of the wedge elements is prevented.

The direct interaction between the lock spring 21 and the wedge elements 17a, 17b allows to avoid any loss of force and function between the lock spring and the wedge elements.

The operation of the reclining device 1 according to the invention, and more specifically of the lock spring 21, is described here below with specific reference to FIGS. 4a, 4b.

Figure 4A:
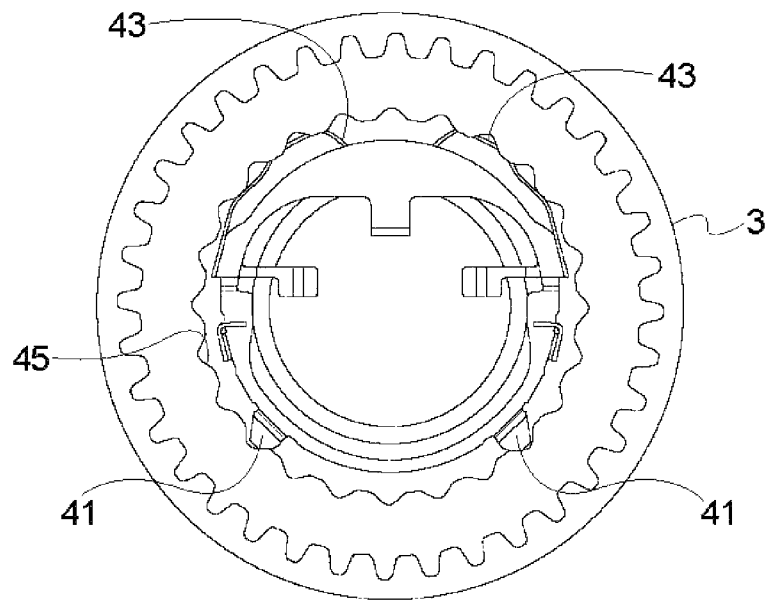

Under normal conditions, the lock spring 21 is in a braked configuration (see FIG. 4a).

In this configuration, the locking teeth 41 are biased by the spring arms 43 towards the ring gear 45 of the first plate 3 (i.e. downwardly in the Figures) and each of said locking teeth is received in the space between two consecutive teeth of said ring gear 45.

In said configuration, relative rotation of the first and second plates is inhibited.

When a user wishes to adjust the inclination of the seat backrest relative to the seat cushion, the reclining device can be moved from the braked configuration to an unbraked configuration by rotating the driver 23 in either a clockwise or a counter-clockwise direction.

When the driver 23 is rotated, the lock spring 21 rotates together with the driver due to the engagement of the bent tabs 37 of said lock spring 21 with said driver 23.

This rotation of the lock spring 21 moves the locking teeth 41 (by overcoming the elastic resistance of the spring arms 43) so that they are no longer locked between adjacent teeth of the ring gear 45.

At the same time, the rotation of the lock spring brings the wedge engaging tab 47 of the lock spring into engagement with one of the wedge elements 17a, 17b.

Figure 4B:
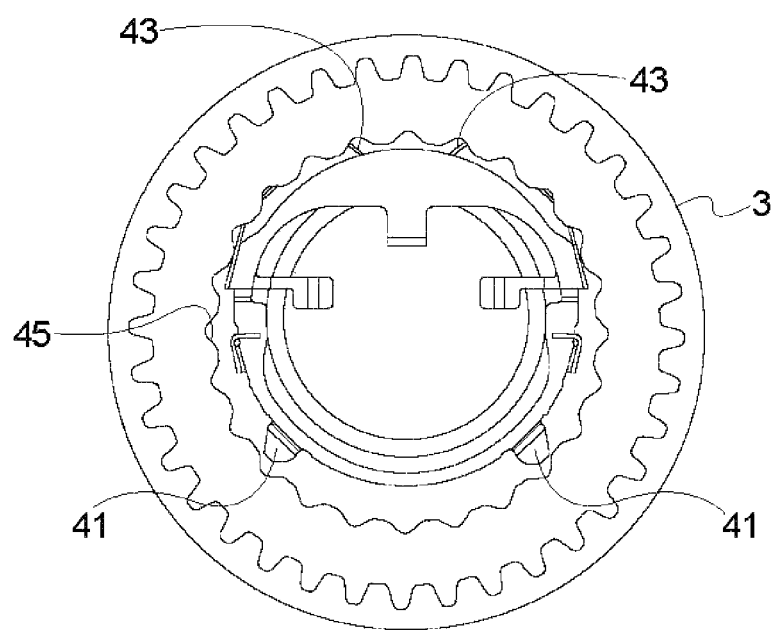
FIG. 4b

Upon further rotation of the driver 23, the engagement between the wedge engaging tab 47 and the wedge elements 17a, 17b restricts rotation of the lock spring 21: as a result, the locking teeth 41 of the lock spring 21 move further away from the ring gear 45 (i.e. upwardly in the Figures) so that they are disengaged and held away from the teeth of said ring gear (see FIG. 4b).

The reclining device is now in an unbraked configuration and a further rotation of the driver 23 causes a relative rotation of the first and second plates 3, 9 and, as a con-sequence, a variation in the inclination of the seat backrest relative to the seat cushion.

This description of a preferred embodiment of the invention has been given by way of mere example and several variants and modifications within the reach of the person skilled in the art can be envisaged, without departing from the scope of the invention as defined by the appended claims.

The invention claimed is:

1. A reclining device, comprising a first plate carrying an internal gear, and a second plate carrying an external gear, the internal gear and the external gear cooperating with each other and the external gear being eccentrically arranged with respect to the internal gear so that teeth of a portion of an outer circumference of the external gear mesh with teeth of a respective portion of an inner circumference of the internal gear, wherein the reclining device further comprises a driver for causing a relative rotation between the first plate and the second plate, wherein the reclining device further comprises a lock spring, the lock spring being switchable from a braked configuration, in which it is integral in rotation with the driver and inhibits a relative rotation between the first plate and the second plate, to an unbraked configuration, in which it is no longer integral in rotation with the driver and allows a relative rotation between the first plate and the second plate, and vice versa, wherein the device further comprises a ring gear which is integral with one of the plates, wherein the lock spring comprises one or more locking teeth, intended to engage the ring gear, and one or more spring arms, which elastically urge the locking teeth towards the ring gear, wherein the spring arms abut against the one of the plates carrying the ring gear for urging the locking teeth towards the ring gear, wherein the lock spring comprises a body made as a thin sheet having a generally circular shape and the spring arms outwardly extend from the outer perimeter of the body of the lock spring in opposite directions, wherein each of the spring arms comprises a first outwardly projecting portion and a second portion running along the outer periphery of the body of the lock spring, wherein the second portions of the spring arms each spans over an angle of more than 45° along the outer periphery of the body of the lock spring and has a first section, proximal to the first portion of the corresponding spring arm, and a second section, distal from the first portion of the corresponding spring arm, wherein the first section is farther from the outer rim of the body of the lock spring than the second section, and the second section increasingly approaches the outer rim of the body of the lock spring and terminates with a free end, distal from the first portion of the corresponding spring arm, which is substantially tangent to the outer rim of the body of the lock spring.

2. The reclining device according to claim 1, wherein the second portions of the spring arms each spans over an angle of about 60° along the outer periphery of the body of the lock spring.

3. The reclining device according to claim 1, wherein the body of the lock spring has a substantially circular overall shape and is provided with a central through-hole which defines a peripheral annular band, and wherein the spring arms outwardly extend from the annular band.

4. The reclining device according to claim 3, wherein the lock spring is provided with a pair of locking teeth, which are symmetrically arranged with respect to a first diameter of the body of the spring lock, and wherein the lock spring is provided with a pair of spring arms, which are symmetrically arranged with respect to the first diameter of the body of the spring lock.

5. The reclining device according to claim 4, wherein the spring arms are arranged on the opposite side of a second diameter of the body of the lock spring that is perpendicular to the first diameter of the body of the lock spring, with respect to the locking teeth.

6. The reclining device according to claim 1, wherein the body of the lock spring is provided with one or more bent tabs, which protrude from the body towards the driver for engagement of the lock spring with the driver.

7. The reclining device according to claim 1, wherein a crescent-shaped space is defined between the internal and external gears and a first and second wedge elements are arranged in the crescent-shaped space, the wedge elements being arranged with their wider portions facing each other near the middle part of the crescent-shaped space and with their narrower portions oriented towards respective, opposite ends of the crescent-shaped space, and wherein a wedge spring is provided for biasing the wedge elements apart from each other.

8. The reclining device according to claim 7, wherein the lock spring comprises a wedge engaging tab that can be brought to abut against and engage the first or the second wedge element.

9. The reclining device according to claim 1, wherein the body of the lock spring is made of metal.

* * * * *